United States Patent
LeFaive et al.

(10) Patent No.: US 7,131,037 B1
(45) Date of Patent: Oct. 31, 2006

(54) METHOD AND SYSTEM TO CORRELATE A SPECIFIC ALARM TO ONE OR MORE EVENTS TO IDENTIFY A POSSIBLE CAUSE OF THE ALARM

(75) Inventors: Ronald Alexander LeFaive, Sunnyvale, CA (US); Sridhar Sodem, Jersey City, NJ (US); Joe Scarpelli, Mountain View, CA (US); Daniel Ketcham, Cupertino, CA (US); Atul Garg, Saratoga, CA (US)

(73) Assignee: Proactivenet, Inc., Santa Clara, CA (US)

( * ) Notice: Subject to any disclaimer, the term of this patent is extended or adjusted under 35 U.S.C. 154(b) by 645 days.

(21) Appl. No.: 10/164,464

(22) Filed: Jun. 5, 2002

(51) Int. Cl.
*G06F 11/00* (2006.01)

(52) U.S. Cl. .................................................. 714/46

(58) Field of Classification Search ............... 714/46, 714/48, 57, 37
See application file for complete search history.

(56) References Cited

U.S. PATENT DOCUMENTS

| | | | |
|---|---|---|---|
| 5,699,403 A * | 12/1997 | Ronnen | 379/15.04 |
| 6,327,677 B1 | 12/2001 | Garg et al. | |
| 6,707,795 B1 * | 3/2004 | Noorhosseini et al. | 370/242 |
| 6,886,113 B1 * | 4/2005 | McKenzie et al. | 714/48 |
| 2002/0184354 A1 * | 12/2002 | McKenzie et al. | 709/223 |
| 2002/0188715 A1 * | 12/2002 | McKenzie et al. | 709/224 |
| 2004/0073844 A1 * | 4/2004 | Unkle et al. | 714/39 |
| 2004/0223461 A1 * | 11/2004 | Scrandis et al. | 370/242 |

OTHER PUBLICATIONS

[ITU-T, 1992] Recommendation X.700. Management framework for Open Systems Interconnection (OSI) for CCITT applications, Sep. 1992.
J. Frey, et al., "Multi-Level Reasoning for Managing Distributed Enterprises and Their Networks", Integrated Network Management V, Chapman and Hall (1997).
Masum Hasan, et al., "A Conceptual Framework for Network Management Event Correlation and Filtering Systems", Integrated Network Management VI, IEEE Press (1999).
K. Houck, et al., "Towards a Practical Alarm Correlation System", Integrated Network Management IV, Chapman and Hall (1995).
Gabriel Jakobson, et al., "Alarm Correlation", IEEE Network, 7(6):52-59, Nov. 1993.
G. Jakobson, et al., "Real-Time Telecommunication Network Management: Extending Event Correlation with Temporal Constraints", Integrated Network Management IV, Chapman and Hall (1995).

(Continued)

*Primary Examiner*—Bryce P. Bonzo
(74) *Attorney, Agent, or Firm*—Blakely, Sokoloff, Taylor & Zafman LLP

(57) ABSTRACT

A system is provided to monitor network performances. The system maintains a database of performance abnormalities, alarms and events from a system of monitored elements. The system automatically identifies a possible cause of a specific alarm by correlating the specific alarm with a plurality of events using the database. The system displays the cause of the specific alarm. The database includes alarms and events of network devices, network systems, and network applications. The specific alarm consists of a notification of an occurrence of the plurality of events.

57 Claims, 10 Drawing Sheets

OTHER PUBLICATIONS

S. Katker, et al., "Fault Isolation and Event Correlation for Integrated Fault Management", Integrated Network Management V, Chapman and Hall (1997).

Irene Katzela, et al., "Schemes for Fault Identification in Communication Networks", IEEE Transactions on Networking, 3(6):753-764, Dec. 1995.

I. Katzela, et al., "Centralized vs Distributed Fault Localization", IFIP/IEEE International Symposium on Integrated Network Management IV ((ISINM'95), pp. 250-261 (1995).

Walter Kehl, et al., "Model-Based Reasoning for the Management of Telecommunication Networks", IEEE International Conf. on Communications, ICC '93, pp. 13-17 (1993).

Shaula Alexander Yemini, et al., "High Speed and Robust Event Correlation", IEEE Communications Magazine, pp. 82-90, May 1996.

S. Klinger, et al., "A Coding Approach to Event Correlation", Integrated Network Management IV, Chapman and Hall (1995).

G. Liu, et al., "Composite Events for Network Event Correlation", Integrated Network Management VI, IEEE Press (1999).

Y. A. Nygate, "Event Correlation Using Rule and Object Based Techniques", Integrated Network Management IV, Chapman and Hall (1995).

Lundy Lewis, "Managing Computer Networks: A Case-Based Reasoning Approach", Artech House (1995).

Dilmar Malheiros Meira, "A Model for Alarm Correlation in Telecommunications Networks", PhD Thesis, Computer Science Department, Federal University of Minas Gerais, Belo Horizonte, Brazil (Nov. 1997).

* cited by examiner

METHOD AND SYSTEM TO CORRELATE A SPECIFIC ALARM TO ONE OR MORE EVENTS TO IDENTIFY A POSSIBLE CAUSE OF THE ALARM

FIELD OF THE INVENTION

This invention relates to network performance monitoring systems. More specifically, this invention relates to correlating a specific alarm to one or more events to identify a possible cause of the alarm.

BACKGROUND OF THE INVENTION

Networks are used to interconnect multiple devices, such as computing devices, and allow the communication of information between the various interconnected devices. Many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases. A network failure or inefficient operation may significantly affect the ability of certain individuals or groups to perform their required functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another.

If a particular network device, a network system, or a network application fails, the network has a performance problem. When there is a performance problem, it usually involves a laborious manual process to diagnose a cause or resource of the problem. A considerable amount of time and effort has to be spent to manually diagnose and identify the cause of the performance problem.

The correlation of the performance problem and the event is difficult because similar symptoms could be caused by different problems: problems in the client or server machines, the routers, the networks, or even by other clients flooding the database server with simultaneous requests. Thus, there are some difficulties and challenges in diagnosing performance problems in a network comprised of multiple devices and systems. These difficulties discussed in more detail below.

One difficulty is that problems can originate in any network, system, or application element. Problems are not always observable where they originate.

Another difficulty is that a single problem can manifest itself as numerous symptoms in multiple elements in multiple domains, i.e., network nodes experience packet loss, database server experiences poor performance, and clients (users) experience longer response times.

Another difficulty is that different problems can manifest themselves as overlapping symptoms, i.e., different problems may exhibit the same or common symptoms.

Still another difficulty is that each managed element can experience different types of problems, and each problem can propagate from the faulty element to other network, system, or application elements making them to appear faulty as well.

Still another difficulty is that symptoms can propagate along relationships between elements, such as upwards from the physical layer to the application layer, and sideways to connected routers and hosts along the connectivity relationship.

Therefore, it becomes necessary to correlate symptoms along related elements, and analyze relationships between elements to identify the effects and cause of a problem.

However, although there is a multitude of management products and mechanisms available to generate detailed operational data about managed elements (devices, systems, and applications) in the form of events and alarms, these product and mechanisms lack the capability to systematically analyze this data and identify the cause of the problem. Thus, when there is a performance problem, it usually involves a laborious manual process to diagnose the cause or source of the problem. This task of sorting through and analyzing the alarms, event and data logs to identify the cause of the problem is left to the skill and expertise of network and system administrators. Moreover, a problem condition may produce a storm (or flood) of events and alarms that further hinder the manual diagnostic process. As a result, a considerable amount of time and effort is typically expended to manually diagnose and pinpoint the cause of performance problems.

SUMMARY OF THE INVENTION

A method and apparatus for providing network performance monitoring including the identification of a possible cause of a specific alarm in a network environment is described. In one embodiment, the method comprises maintaining a database of alarms and events from a system of monitored elements and automatically identifying a possible cause of a specific alarm by correlating the specific alarm with a plurality of events using the database. Automatically identifying the possible cause is based on analysis of performance abnormalities based on performance data and using detected performance abnormalities to identify the possible cause.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A network-related monitoring system and method are described that identify a possible cause of a specific alarm within a system of monitored elements. The monitoring technique can be used to monitor the operation and performance of a network environment, including various network devices. As discussed herein, the term "network environment" shall include all systems, components, sub-systems, network devices, communication links, applications, and any other systems or components (including both software and hardware) coupled to or used in conjunction with a network.

In one embodiment, in addition to monitoring an overall network environment, the monitoring techniques described herein are able to monitor the operation and performance of specific devices (such as network devices), including various components or sub-systems within a device. The monitoring system can automatically identify a possible cause of a network performance problem.

In one embodiment, the automatic identification of one or more possible causes is based on statistical quality control principles. More specifically, in one embodiment, this cause identification analysis includes sifting through performance abnormalities, other events or alerts including threshold alerts, change events, etc., using statistical correlation to generate a list of possible candidate causes of a problem, eliminating unrelated causes of the problem using isolation filtering, and pinpointing a root cause through scoring and categorization. A key to this process is the focus on performance abnormalities, or "abnormal" data points, as opposed to all the data points that have been collected, in order to identify a root cause to a problem. In one embodiment, identification of the cause of a problem is based on analysis of performance abnormalities, other events and alerts, statistical correlation, elimination of unrelated causes, and user defined groupings and relative weightings of elements being monitored.

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Figure 1:
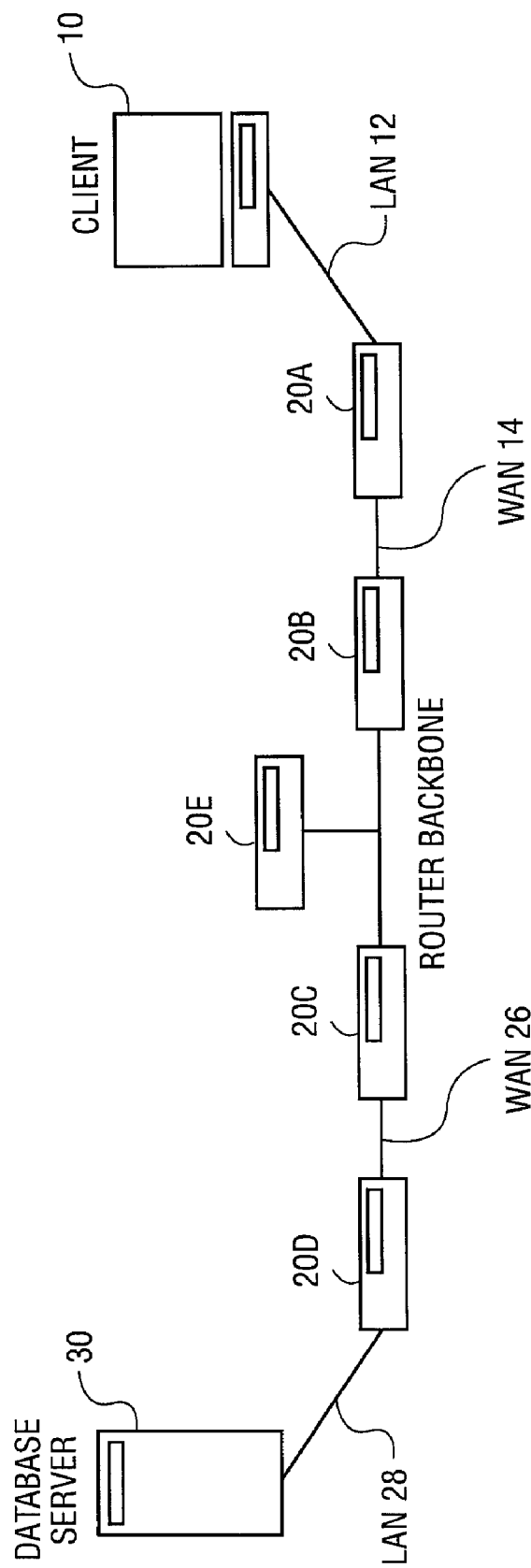
FIG. 1 is a block diagram of one embodiment of a network system.

FIG. 1 is a block diagram of one embodiment of a network system. Referring to FIG. 1, the network system includes different devices such as a client machine, routers, and database server coupled with each other. In particular, a client machine 10 is coupled with a router 20A through a Local Area Network 12 (LAN 12). The router 20A is then coupled with a router 20B through a Wide Area Network 14 (WAN 14).

A backbone network can be formed in such a structure including the router 20B, a router 20C, a router 20E, and a router backbone 16. The backbone network has the central router backbone 16 to which other network devices (such as router 20B, 20C and 20E) may be attached. The router 20C is then coupled with a router 20D through a WAN 26. The router 20D is coupled with a database server 30 through a LAN 28. In such a basic network structure, nodes and devices can communicate with each other by sending packets across the network.

Typically, upon a request by the client machine 10, the database server sends information in packets through the network. In particular, the packets are sent from the database server 30 to the client machine 10 via the LAN 28, the router 20D, the WAN 26, the backbone network (the router 20C, the router 20B, the router 20E, and the router backbone 16), the WAN 14, the router 20A, and the LAN 12.

However, there can be a problem during the packet transportation. For example, an event in an interface in router 20C may cause bit errors in packets routed over the router 20C and router 20D link. Furthermore, the bit errors can cause packet losses, which can cause poor performance for TCP connections over the router 20C and router 20D link. Eventually, the poor performance for TCP connections can cause longer database transactions that degrade database server performance, and result in aborted client transactions. When the network system has a performance problem such as aborted client transactions, it is desirable to identify a cause of the performance problem and to correlate the performance problem to the router 20C.

The monitoring technique described herein solves the problem by identifying a cause of a specific alarm automatically. In one embodiment, these teachings reduce the number of alarms and enriches the meaning of the alarms shown to the network and systems administrators. The monitoring makes use of alarm correlation techniques and involves processing a large number of events, including excluding some events, observing cause-effect relationships among other events, and finally inferring the source or cause of the problem from a set of related events.

Figure 2A:
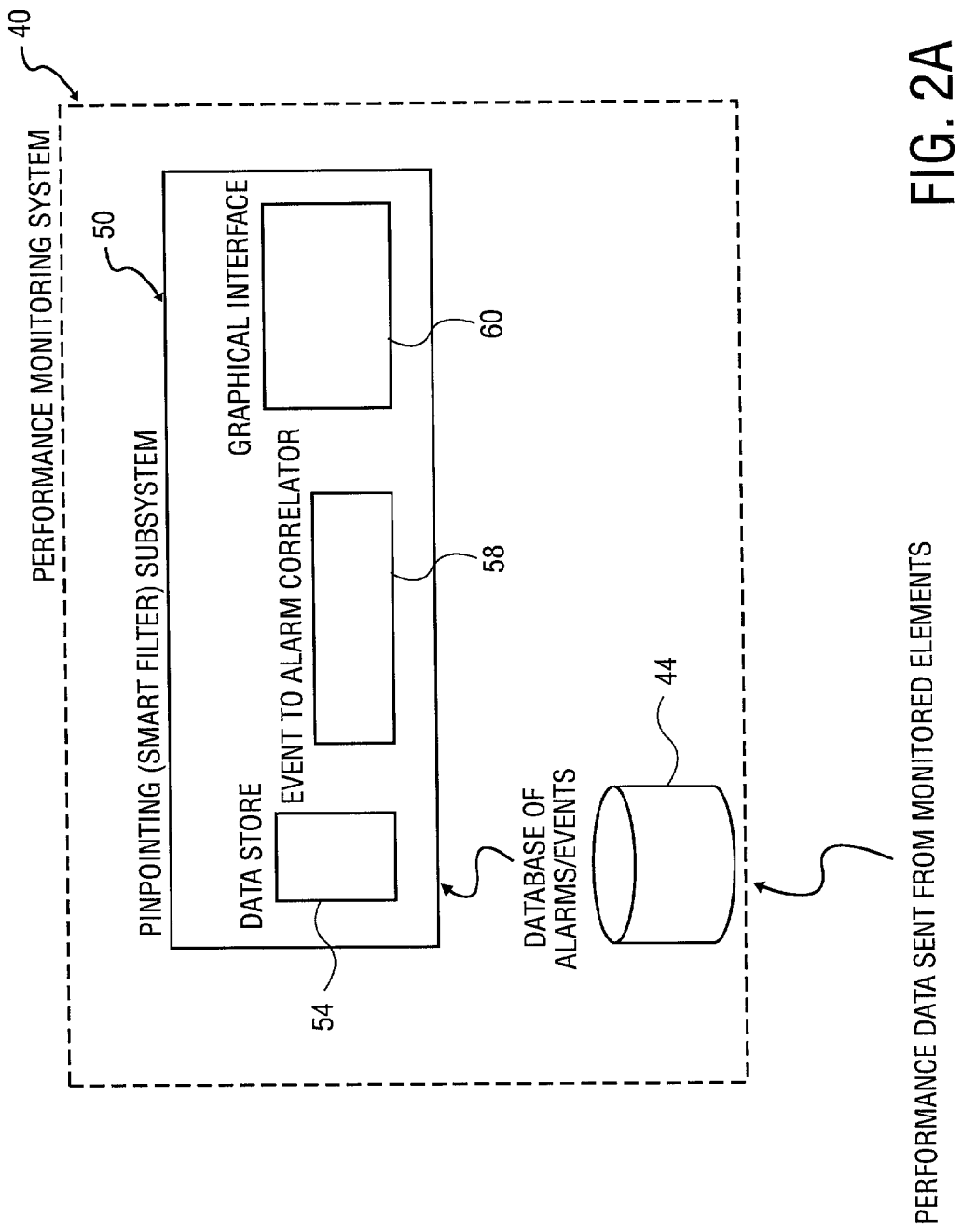
FIG. 2A is a block diagram of one embodiment of a performance monitoring system.

FIG. 2A is a block diagram of one embodiment of a performance monitoring system. Referring to FIG. 2A, the performance monitoring system 40 receives performance data from monitored elements. The monitored elements may include network systems, network devices, and network applications. Monitored elements may comprise components including, but not limited to, computer, computer network, and application, which can be measured in a quantitative way. The monitored elements usually give quantitative values, which indicate the performance of that component. Specifically, a monitored element can be made up of a specific set of attributes that are used to measure one function of a broader component. For example, a monitored element of type "web URL" can measure a web server's response time and return a specific URL and its availability. Another example of a monitored element may be a disk, which has attributes such as busy time, service time, number of written bytes, number of read bytes. Other examples of monitored elements could be an operating system, a specific application, a specific router (type of network device), etc.

The monitored system generates alarm and events if there is a performance problem in the network. In one embodiment, alarms can be generated within the system of monitored elements. In another embodiment, alarms can be received from other sources. In one embodiment, the alarm may consist of a notification of the occurrence of a specific event, which may or may not represent an error.

In one embodiment, the performance monitoring system 40 includes a database 44 and an identification subsystem 50. The database 44 is coupled to receive performance data from monitored elements and create records of alarms and events. The identification subsystem 50 is coupled to the database 44. Upon a request of a network system, the database 44 sends packages of alarms and events to the identification subsystem 50.

The identification subsystem 50 includes a datastore 54, an event to alarm correlator 58, and a graphical interface 60. The datastore 54 is coupled to the database 44 to receive information (e.g., packets) on alarms and events. The datastore 54 classifies the events based on different standards. In one embodiment, the datastore 54 classifies the events based on functional groups. In one embodiment, a functional group is comprised of a specific device type within the monitored system. A function is defined within an alarm-filtering system according to a meta-data definition. In addition, in one embodiment, the datastore 54 generates a probability value between 0 to 1 to represent the inter-relationship of a functional group with other functional groups. The probability value indicates the possible correlation between an alarm and the events generated during a specific period.

In another embodiment, the datastore 54 classifies the events based on attribute groups. An attribute group may comprise a specific performance statistic within a monitored system. An attribute is defined within the alarm-filtering system according to a meta-data definition. Examples of attributes include, but are not limited to: application and database response time, load or errors in a network device, and server central processing unit (CPU)-memory utilization.

Furthermore, in one embodiment, the datastore 54 generates an attribute value to represent the importance of an absolute or baseline event on an attribute. In one embodiment, the attribute value can range from 0 to 5.

In one embodiment, two kinds of events can be generated: an absolute threshold event and a baseline event. The user can set an absolute threshold for any statistic being monitored. If that threshold is crossed, an absolute threshold event is generated. That is, absolute performance thresholds compare a value from a monitored element with a value specified. If the value exceeds the threshold, performance is assumed to be impacted. Alarms are generated automatically for all absolute threshold events.

In contrast, baseline performance thresholds compare a value from a monitored element with what is normal for that value. To that end, a normal operating range is determined for each performance attribute that is collected. The normal operating range may be different for different times of day and different days of the week. Therefore, a number of thresholds associated potentially with different days and/or different hours in the day may be used for a performance attribute of a monitored element. Alarms may be generated for baseline threshold events if the user has configured the system to do so.

An example of the absolute performance threshold is a check to see if the time needed to retrieve a web page for a web server took more than 4 seconds. An example of a baseline performance threshold would be if the normal time for the above request was 2 seconds then the baseline threshold may check to see if there were too many values above 2 seconds.

After the datastore 54 classifies the events, the events are sent to the event-to-alarm correlator 58. The event-to-alarm correlator 58 is coupled to the datastore 54 to receive classified events. The event-to-alarm correlator 58 also receives information of the classified events, such as, for example, the probability value of functional groups, and the attribute value of attribute groups. Based on the information collected from the datastore 54, the event-to-alarm correlator 58 applies a mandatory set of rules and an optional set of rules to filter the time correlated events against a specific alarm.

In one embodiment, the event-to-alarm correlator 58 applies alarm correlation techniques to the classified events. One advantage of alarm correlation techniques is that those techniques can be applied to any of the five management functional areas defined by the ITU-T, namely, fault management, configuration management, accounting management, performance management and security management [ITU-T, 1992 Recommendation X.700. Management framework for Open Systems Interconnection (OSI) for CCIT applications, September 1992].

In one embodiment, the event-to-alarm correlator 58 correlates alarms and events pertaining to response time degradation in the performance management area for web-based services and applications, as well as correlate alarms and events pertaining to availability (the "up-down" state) of the network. In addition, the event-to-alarm correlator 58 also monitors response time degradation by using both absolute and baseline performance thresholds.

Having the identification subsystem 50, the monitoring system 40 monitors the response times of various components of a web site's infrastructure (the web server software, database, server, network, etc.). Most of these components are measured in terms of their "response time", that is, how quickly they respond to a request made from them. Each component's response time is usually within a certain range (e.g., between 0.1 and 0.3 seconds). If any of the response time's start to deviate from their usual range, it is considered a "response time degradation".

Typically, response time degradation happens when a user transaction starts to take longer than normal. Examples of user transactions include, but are not limited to, Web URL requests, mail server response, ftp server response, database query response time. In some cases, a response time can degrade exponentially, often to the point where the transaction fails. The performance monitoring system 40 detects response time degradation problems early before they become hard failures.

To filter the events from the datastore 54, the event-to-alarm correlator 58 applies certain rules to events. If the events satisfy the rules, the events are classified as filter-pass events. If the events do not satisfy the rules, the events are classified as filter-fail events. The event-to-alarm correlator 58 then computes an event score or confidence factor for the filter-pass events, where the event score indicates the possibility of the event being the cause of the problem and is represented by a value ranging from 0 to 100 (not likely to most likely).

The graphical interface 60 is coupled to the event to alarm correlator 58 to receive the event score. The graphical interface 60 provides a visual indication of the cause of the alarm and displays the computed correlation between events and the specific alarm. In particular, the graphical interface 60 displays the event score in percentage for each event.

Figure 2B:
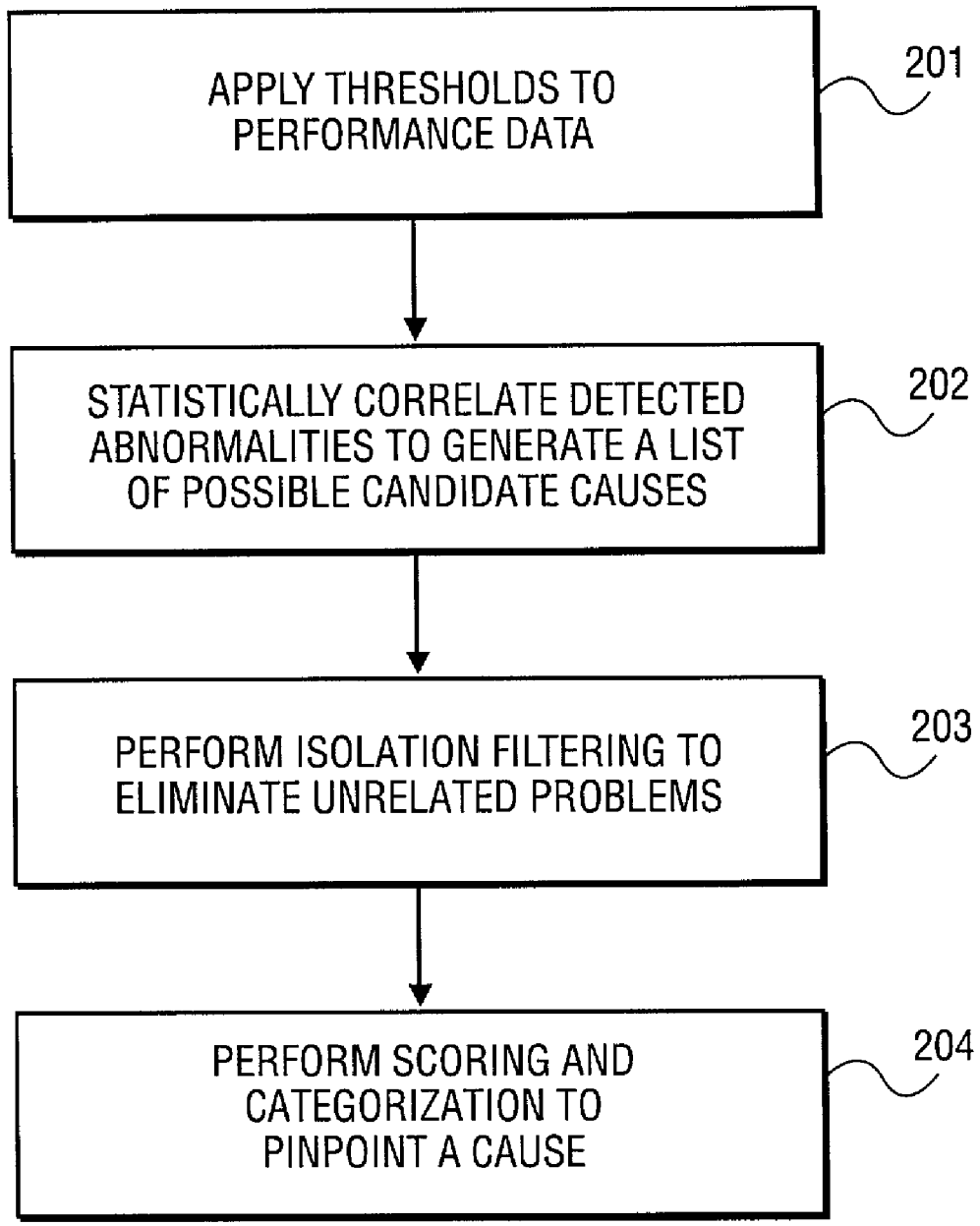
FIG. 2B is a flow diagram of one embodiment of a process for performance monitoring.

FIG. 2B is a flow diagram of one embodiment of a process for identifying a cause of a performance problem. Such a process is performed by processing logic that may comprise hardware, software, or a combination of both. Such a process may be performed by the performance monitoring system of FIG. 2A.

Referring to FIG. 2B, processing logic applies thresholds to performance data to detect performance abnormalities (processing block 201). The performance data may comprise network, system, and application performance data and an indication of their abnormalities. The performance data may also include user defined alarm conditions related to performance attributes that a user sets because of a user-defined importance. As discussed above, the alarm conditions may be based on absolute performance thresholds or other criteria. The performance data may also include configuration and other changes in the network environment. For example, such a change may include the addition of new software. Processing logic filters the performance data using thresholds to detect the performance abnormalities.

After detecting performance abnormalities, processing logic statistically correlates detected abnormalities to generate a list of possible candidate causes (processing block 202). In one embodiment, this statistical correlation correlates detected abnormalities in an application infrastructure that has a slow response time. In one embodiment, the statistic correlation employs statistical pattern recognition of candidate abnormalities occurring around the same time as the slow application response.

After applying statistical correlation, processing logic performs isolation filtering to eliminate unrelated problems (processing block 203). For example, the isolation filtering may eliminate or suppress abnormalities that are statistically correlated but not a likely cause of an application to slow down. Such filtering may be based on predefined domain knowledge. The user may also specify certain groups and limit the analysis to devices in those groups. For example, if there is a web transaction slowdown, then an email round-trip abnormality is unrelated and is filtered out. In another example, if a set of web transactions depends upon an LDAP server for authentication and the LDAP server is not available, then all the abnormalities on the dependent transactions are suppressed and filtered out.

After performing isolation filtering to eliminate unrelated problems, processing logic performs scoring and categorization to pinpoint the cause (processing block 204). In one embodiment, the scoring and categorization involves scoring the remaining events and abnormalities that remain after the three layers of filtering discussed above. In one embodiment, several factors effect the scoring events. For example, the degree of the abnormality can cause the score to be increased if the event was an extreme deviation from the baseline as opposed to a minor deviation. As another example, if a web transaction is slow, then a database abnormality is more likely the cause, giving it a higher score, then a router discard if the network latency is normal, which would cause a lower score.

Figure 3:
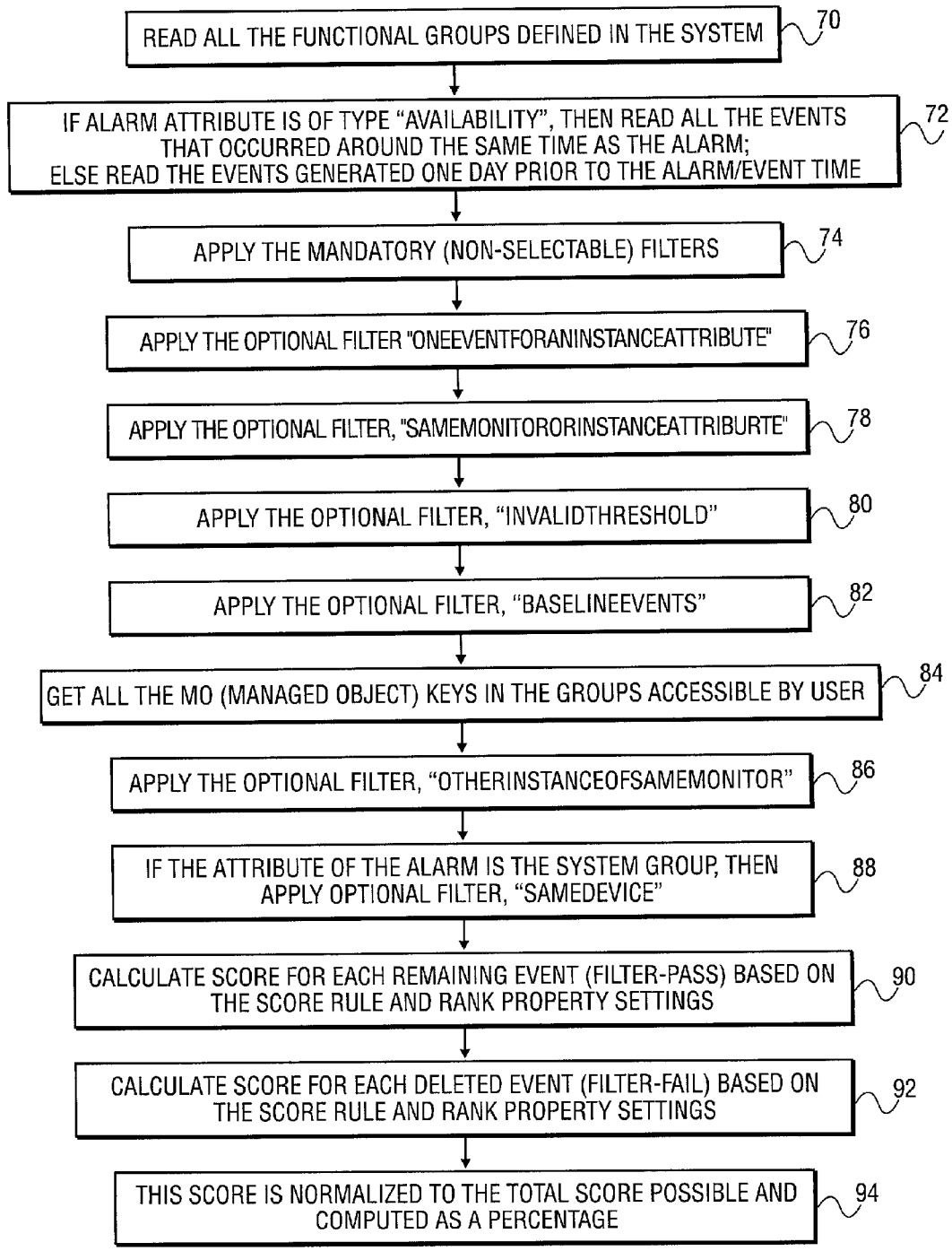
FIG. 3 is a flow diagram illustrating an embodiment of a process for identifying a possible cause of a network problem.

FIG. 3 is a flow diagram of an embodiment of a process for identifying a possible cause of a performance problem. FIG. 3 may be performed by the data store 54 and the event-to-alarm correlator 58 in FIG. 2A.

At processing block 70, processing logic classifies the events based on functional groups. The functional group classification is based on the type of device that is being monitored. The device type is specified while adding or editing the device properties. In one embodiment, the functional groups are defined by a meta-data, such as Name uniquely identifying this group ("Unique Name"), Name shown in the GUI ("Display Name"), Order in which shown in the GUI ("Order"), Functional or Attribute Group ("Group Type"), and Name of the .gif file to be shown in the GUI for this functional group (GIF Name). This information is contained in a file / . . . / . . . /conf/pinpointfgattr.conf. in Appendix A.

In one embodiment, the grouping is used by the Graphical User Interface (GUI) to organize the correlated events, with the following being the default groups identified, and any additional groups can be created at run time.

| Functional Group | Device Type |
|---|---|
| Web Servers | Web Server |
| Firewall | Firewall |
| Database Servers | DBServer |
| Application Servers | AppServer |
| Network Servers | Router, Hub, Switch, Repeater, Rmon Probe |
| Other Servers | Printer, Workstation, NT Server, Server, Print Server, Mail Server, Other |

Processing block 70 further includes processing logic generating a probability value for a functional group. In one embodiment, a functional group may be tightly coupled with other functional groups. This relationship is represented by the probability value between 0 and 1 to indicate the possible correlation between an alarm and the events generated during a specific period. The information of the probability value for each functional group is contained in a file / . . . / . . . /conf/pinpointfgattr.conf. in Appendix A.

At processing block 72, processing logic classifies the events based on attribute groups. An attribute is any monitored statistic that is defined within the system. The attribute group classification may be based on grouping certain statistic attributes in order to apply a special logic in the filtering algorithm. In one embodiment, the attribute group is defined by the following meta-data such as Name uniquely identifying this group ("Attribute Group"), Monitor unique name to which it belongs ("Monitor Name"), Attribute unique name ("Attribute Name"), Importance of the absolute event on this attribute ("Rank"), Importance of the above baseline event on this attribute ("Above Normal"), and Importance of the below baseline event on this attribute ("Below Normal"). This information is contained in a file / . . . / . . . /conf/pinpointfgattr.conf. in Appendix A.

In one embodiment, the valid groups are "ResponseTime", "Availability", and "System". If a particular attribute does not fall into one of these categories, the attribute group is left blank, which means no special logic is applied to the events on these attributes. Typically, these groups are internal to the system and their usage is hard-coded. Events pertaining to the same attribute group of the alarm are shown.

Specifically, if the alarm is on "Response Time" type of attribute, events pertaining to response time are shown. This classification helps in bubbling up the events on response time attributes by increasing their score. If the alarm is on "Availability" type of attribute, events generated in the specified time period are shown; otherwise, open events generated in the past one day are shown. If the alarm is on "System" type of attribute and the DeviceFilter rule is enabled, all the events pertaining only to that device (host) are shown.

In addition, at processing block 72, processing logic provides each attribute an attribute score in a range of 0 (ignore) to 5 (very high) to indicate the importance of the attribute with reference to an absolute or baseline event to determine a performance problem. If the attribute rank is 0, none of the events on this attribute are shown. This information of the attribute scores is contained in a file / . . . / . . . /conf/pinpointfgattr.conf. in Appendix A.

Since a specific alarm consists of a notification of an occurrence of specific events, the alarm and the events may occur around the same time. Therefore, in one embodiment, at processing block 72, processing logic classifies the events based on "Availability" groups. In one embodiment, if the alarm attribute is of Type "Availability", processing logic reads all events that occurred around the same time as the alarm. If the alarm attribute is not of type "Availability", processing logic reads all events occurred some time prior to the alarm time. At one alternative, if the alarm attribute is not of type "Availability", processing logic reads all events occurred one day prior to the alarm time.

At processing blocks 74, 76, 78, 80, 82, 86, and 88, based on the alarm selected, processing logic applies certain rules or filters against all the events that occurred around the same time to find out the most likely cause of the problem. If an event satisfies the certain rules or filters, the event is classified as filter-pass event. In contrast, if an event does not satisfy certain rules or filters, the event is classified as filter-fail event. In one embodiment, all the filters are built into the product. No filters can be added at run time, but some filters are selectable at run time. The filter configuration properties are specified in a file / . . . / . . . /conf/pinpoint.conf. in Appendix B.

At processing block 74, processing logic applies the mandatory filters to the events. In one embodiment, processing logic filters out events with certain characteristics. One example of filtered out event is that the event is on monitor instances to which the user does not have access permissions. Another example is that the event's host ID is 0. Another example is that the event is referred by the event/alarm that is selected. Another example is that when the event is closed, the end time of the initial event is updated to closed time and a new record is inserted saying the event is closed. Another example is that the attribute importance specified in the property file is 0. Still another example is that the event is an above baseline event, and above baseline importance specified in the property file is 0. Still another example is that the event is a below baseline event, and below baseline importance specified in the property file is 0.

At processing blocks 76, 78, 80, 82, 86, and 88, processing logic applies optional filters to the events. These filters can be selectively turned on/off. However, it is expected that a knowledgeable user will change the default selections; otherwise, a lot of events may be shown.

At processing block 76, processing logic applies One Event For An Instance Attribute Filter, and the latest event is shown for each monitor instance attribute.

At processing block 78, processing logic applies Same Monitor Instance Attribute Filter, and events on the same monitor instance and attribute of the alarm/event selected for filtering are not shown.

At processing block 80, processing logic applies Invalid Threshold Filter and events based on thresholds deleted by the user are not shown.

At processing block 82, processing logic applies Baseline Events Filter, and none of the baseline events are shown.

Typically, a user of the product may be restricted to only see certain "monitored elements" while using the product (a security feature). The restriction is done by restricting the user to a set of monitors (these are the groups). Each monitored element is represented by a managed object key (MO Key). At processing block 84, processing logic collects the MO keys in the groups accessible by users and ensures users do not see the data from a monitored element they are restricted from.

At processing block 86, processing logic applies Other Instance of Same Monitor Filter, and the event is not shown if the event's monitor type is same but the monitor instances are different.

One exception to Other Instance of Same Monitor Filter is the situation that the alarm/event in question belongs to a pinpoint group (group whose pinpoint flag is turned on), and the monitor type is Web URL or Web Transaction. In one embodiment, the exception has two possible scenarios.

The first scenario is that AllWebURLInSamePPGrpForWebURL filter is on, monitor type is WebURL, event monitor type is Web URL, and this event belongs to the same pinpoint group. In such a scenario, the event is shown. The second scenario is that allWebURLAndXInSamePPGrpForWebX filter is on, monitor type is Web Transaction, event monitor type is Web URL (or Transaction), and the event belongs to the same pinpoint group. In such a scenario, the event is shown.

At processing block 88, processing logic applies Same Device Filter if the alarm attribute is of type "System". This filter is applicable only when the attribute of the alarm/event selected for pinpointing is of System group. The filter removes all the events on monitor instances belonging to a different device than the device the alarm/event in question.

At processing blocks 90, 92, and 94, processing logic generates an event score or confidence factor for each event, where the event score indicates the possibility of the event being the cause of the problem. The event score is a value ranging from 0 to 100 (not likely to most likely) and is shown as a percentage. In particular, at processing block 90, processing logic calculates an event score for each filter-pass event. At processing block 92, processing logic calculates the event score for each filter-fail events.

At processing block 94, after calculating the event score for each event, processing logic normalizes all event scores to a total possible score based on the scoring rules configuration settings.

Although the scoring rules can be turned on/off and the scoring points can be changed, it is expected that a knowledgeable user will alter the default settings; otherwise, unrelated events may be shown as the possible cause. In one embodiment, at processing blocks 90, 92, and 94, processing logic applies following scoring rules to calculate the event score and the total possible score.

Processing logic applies one rule to events of Same Function Group. In one embodiment, if the event's attribute falls into the same functional group as the alarm attribute, the score is increased. The rule can be turned on/off by setting scoreRules.SameFunctionalArea and the rank to be used is determined by scorePoints.SameFunctionalArea property. In one embodiment, default is on and the rank is 1.

Processing logic applies another rule to events of Event Severity. In one embodiment, if the event is an absolute threshold event, the score is increased. The rule can be turned on/off by setting scoreRules.AbsoluteEventSeverity and the rank to be used is determined by scorePoints.AbsoluteEventSeverity property. In one embodiment, default is on and the rank is 1.

Processing logic applies another rule to events of Baseline Extremeness. In one embodiment, if the event is baseline event, the score is increased by the event's % of extremeness with respect to baseline. This rule can be turned on/off by setting scoreRules.BaselineEventExtremeness and the rank to be used is determined by scorePoints.BaselineEventExtremeness property. In one embodiment, default is on and the rank is 1.

Processing logic applies another rule to events of Same Device. In one embodiment, if the event belongs to the same device as the alarm, the score is increased. This is useful in the groups where we show events on all the devices. The rule can be turned on/off by setting scoreRules.EventOnSameDevice and rank to be used is determined by scorePoints.EventOnSameDevice property. In one embodiment, default is on and the rank is 1.

Processing logic applies another rule to events of Same Instance. In one embodiment, if the event belongs to the same instance as the alarm, the score is increased. The rule can be turned on/off by setting scoreRules.EventOnSameInstance and the rank to be used is determined by scorePoints.EventOnSameInstance property. In one embodiment, default is on and the rank is 1.

Processing logic applies another rule to events of Same User Group. In one embodiment, if the instance on which alarm is raised and the event's instance belong to the same pinpoint group (user created group), the score is increased. This rule can be turned on/off by setting scoreRules.EventInSameUserGroup and the rank to be used is determined by scorePoints.EventInSameUserGroup property. In one embodiment, default is on and the rank is 1.

Processing logic applies another rule to events of Response Time. In one embodiment, if the event's attribute is response time type of attribute, the score is increased. The rule can be turned on/off by setting scoreRules.ResponseTimeEvent and the rank to be used is determined by scorePoints.ResponseTimeEvent property. In one embodiment, default is on and the rank is 1.

Processing logic applies another rule to the situation of Event Duration. In one embodiment, if the alarm is open, the score is increased based on the percentage of time the event is open during the period. The rule can be turned on/off by setting scoreRules.EventDuration and the rank to be used is determined by scorePoints.EventDuration property. In one embodiment, default is on and the rank is 1.

FIGS. 4, 5, 6, 7A, 7B, and 7C are diagrams of exemplary pages of the graphical user interface. In particular, FIGS. 4, 5, 6, 7A, 7B, and 7C are diagrams illustrating certain functions of the graphical interface 60 in FIG. 2A. The users (network and systems administrators) can use a graphical user interface that is a part of the identification subsystem 50 as shown in FIG. 2A.

Figure 4:
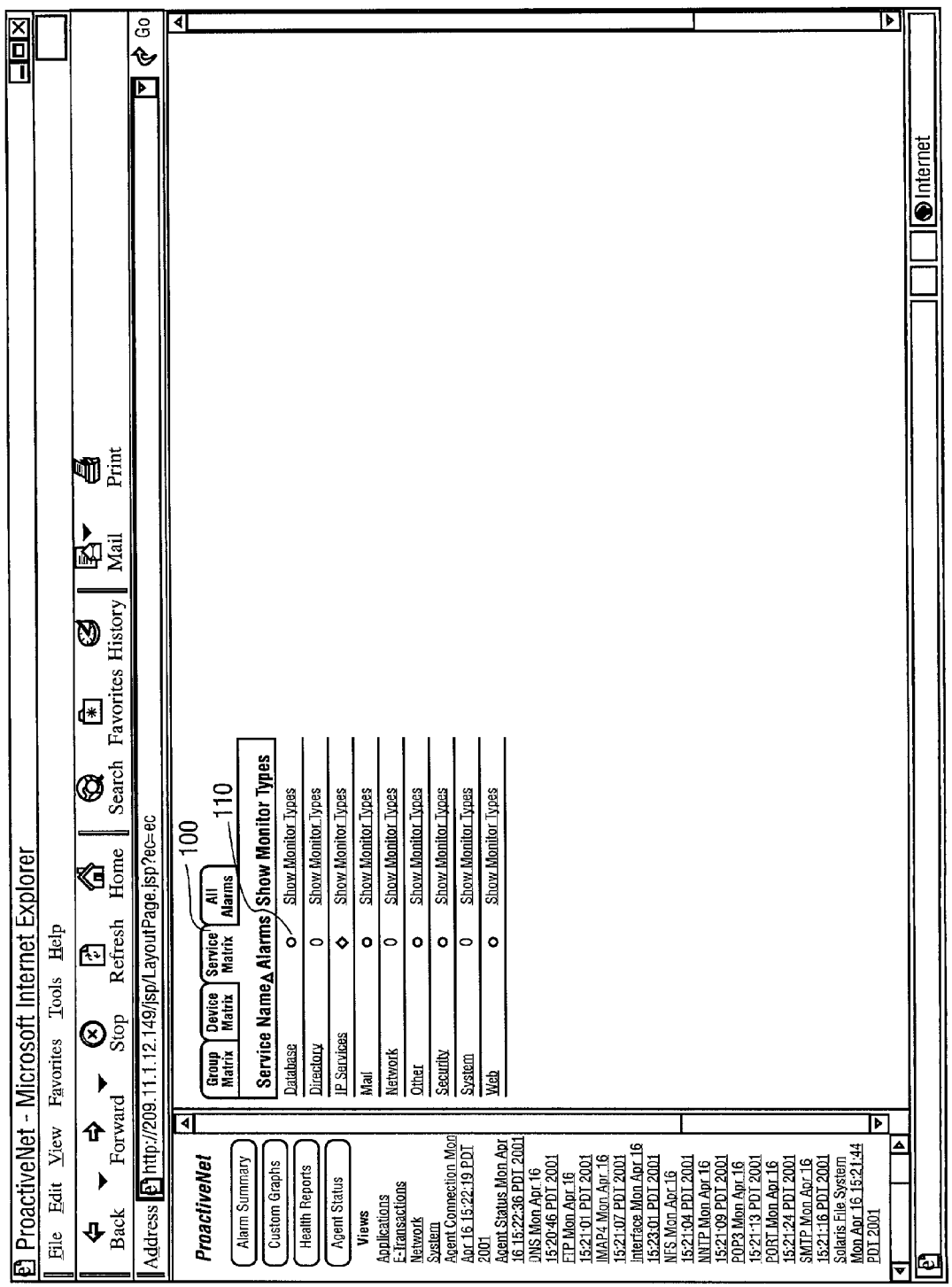
FIG. 4 is a diagram of an exemplary alarm summary page of a graphical user interface.

FIG. 4 displays an Alarm Summary page of the graphical interface. In particular, FIG. 4 displays the alarm summary page if the "service matrix" tab 100 is clicked.

Figure 5:
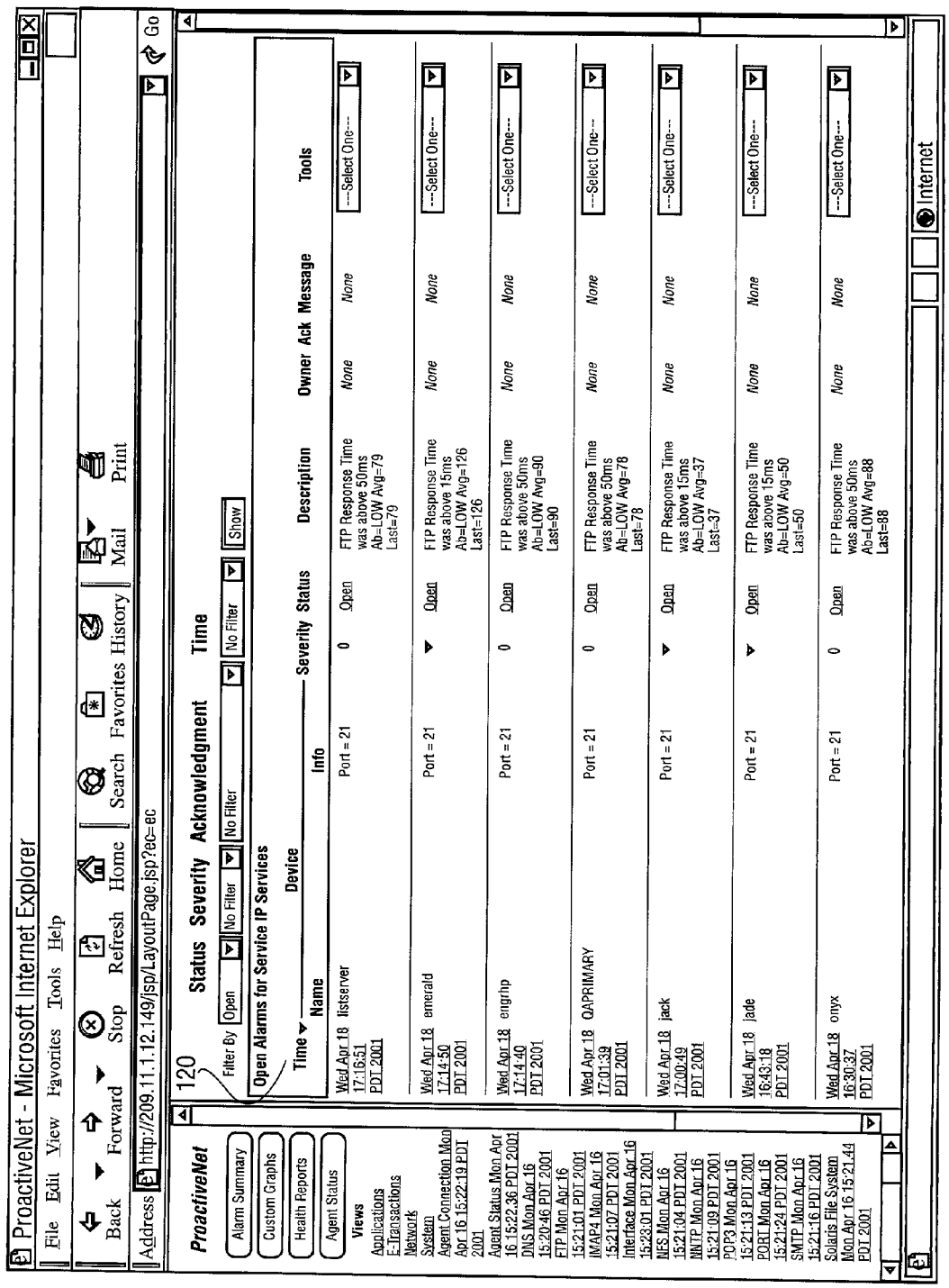
FIG. 5 is a diagram of an exemplary alarm list page of the graphical user interface.

FIG. 5 displays an Alarm List page of the graphical interface. If an alarm icon 110 is clicked on the service matrix page of FIG. 4, FIG. 5 pops out to display the alarm list for that alarm.

Figure 6:
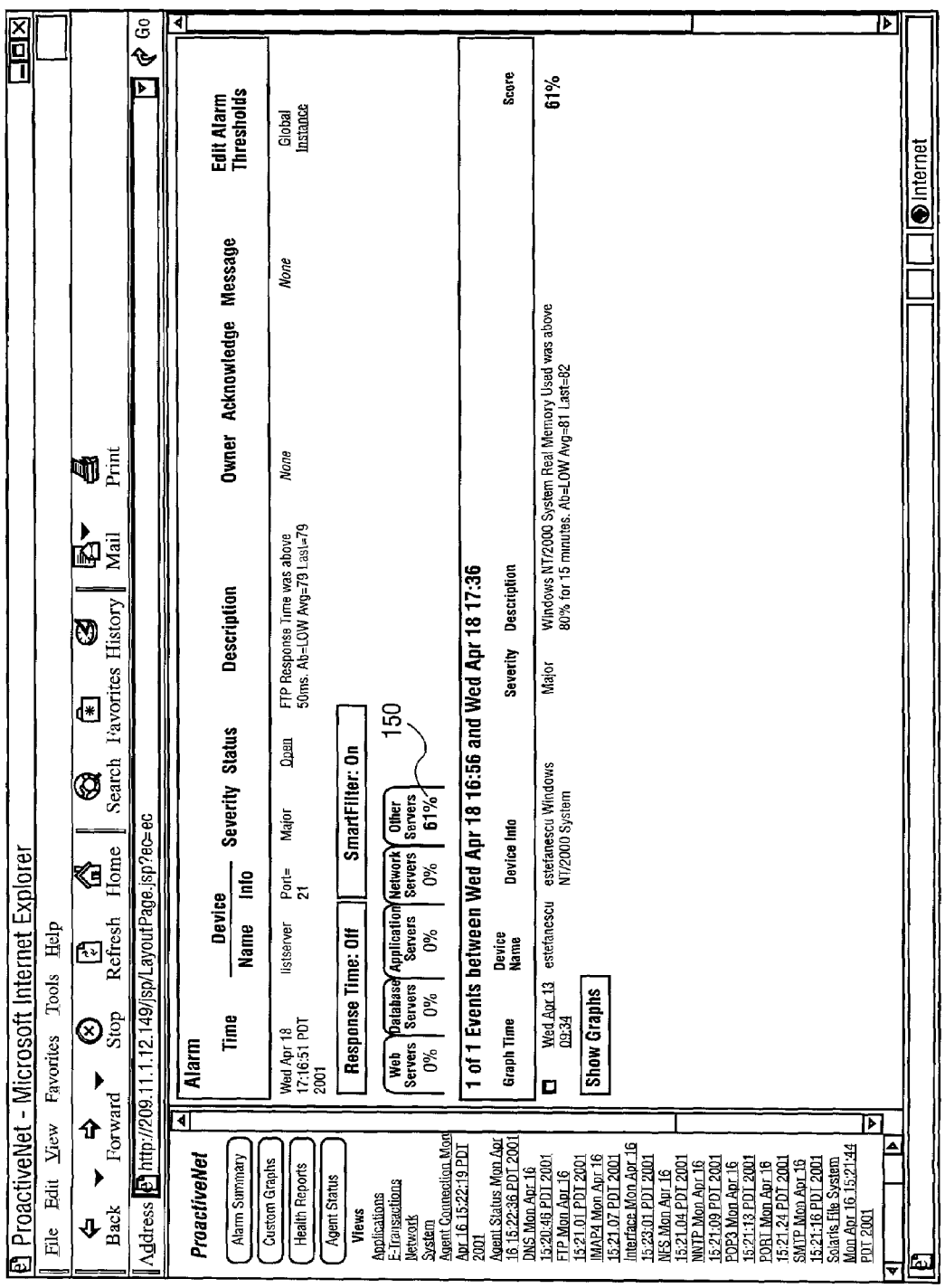
FIG. 6 is a diagram of an exemplary smart filters page of the graphical user interface.

FIG. 6 displays a Smart Filters page of the graphical interface. If the time field 120 of any alarm is clicked on the alarm list page of FIG. 5, the "smart filter" page for that alarm is displayed. FIG. 6 shows the possible source of the problem that caused the alarm along with its associated probability. In particular, FIG. 6 indicates that the probable cause of the alarm is other servers 150 along with its associated probability 61%.

Figure 7A:
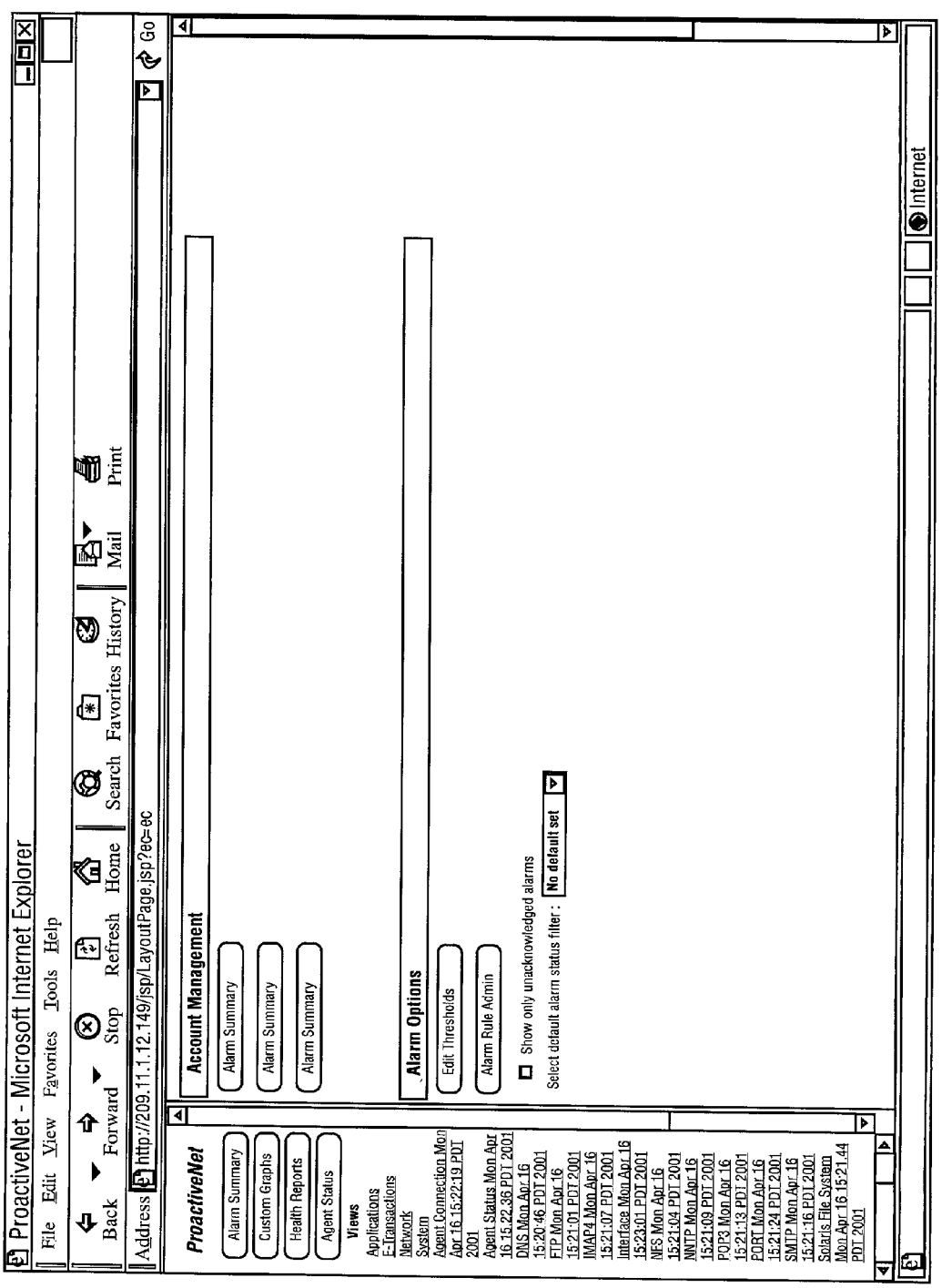
FIGS. 7A–7C are diagrams of exemplary administration pages of the graphical user interface.
Figure 7B:
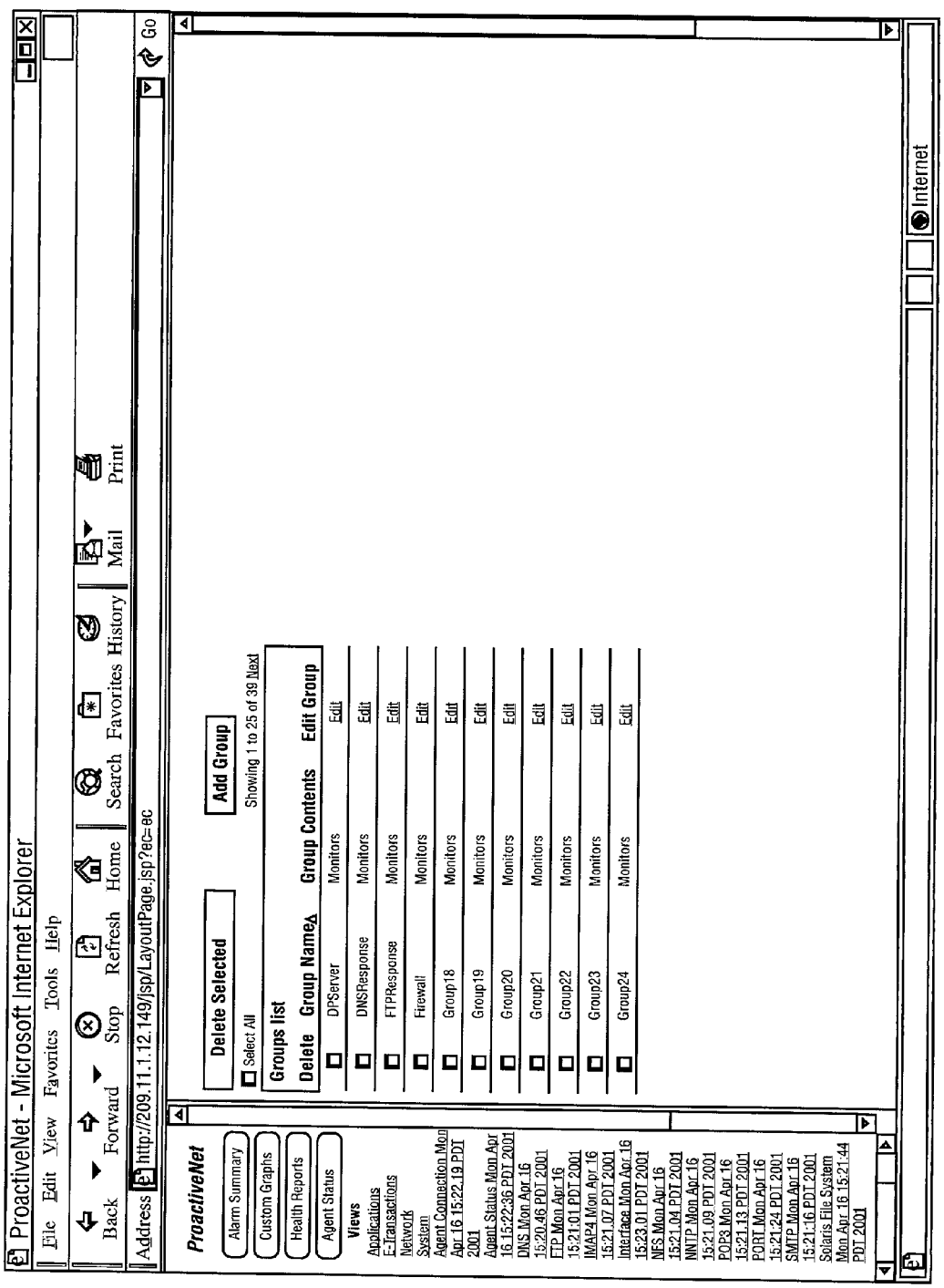
Figure 7C:
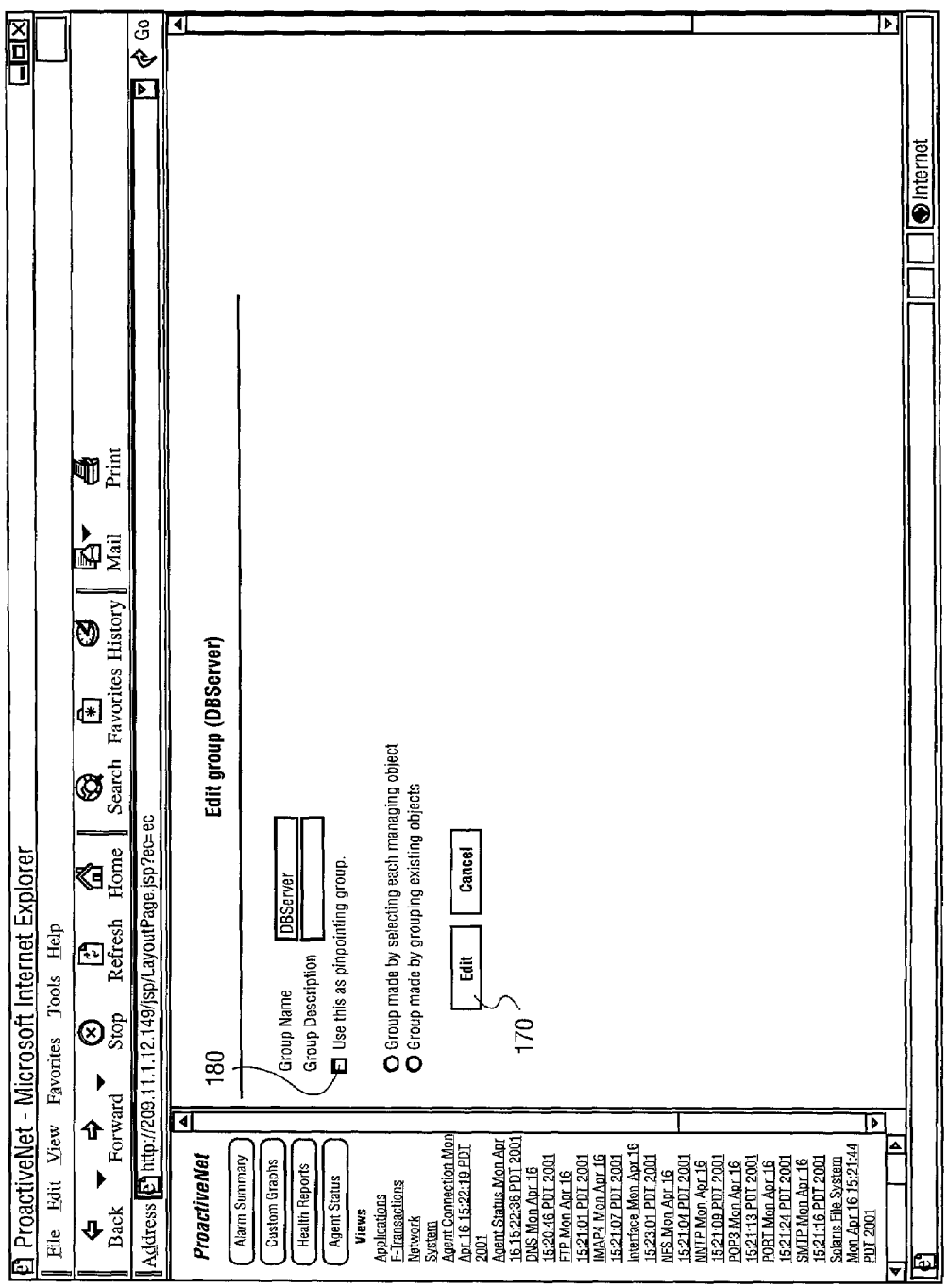

FIGS. 7A–7C display Administration pages of the graphical interface (select a group as the Pinpoint group). FIG. 7A displays the administration page if the "options" button on the left side frame (not shown) is clicked. FIG. 7B displays the Group Administration page if the "group admin" button is clicked. FIG. 7C displays the "edit group" page if the "edit" link 170 of a particular group is clicked. In particular, the checkbox "Use this as pinpointing group" 180 let the user select a particular group as the Pinpoint group.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

---

Appendix A

Smart filter functional groups and attributes configuration file
/ . . . / . . . /conf/pinpointfgattr.conf
[Functional Groups]

| #Group Name | ,Display Name | ,Order,Type,GIF Name |
|---|---|---|
| Web | ,Web Servers | ,1 ,F |
| Firewall | ,Firewall | ,2 ,F |
| Application | ,Application Servers | ,3 ,F |
| Database | ,Database Servers | ,4 ,F |
| Network | ,Network Devices | ,5 ,F |
| Other | ,Other Servers | ,6 ,F |
| ResponseTime | ,Response Time | ,7 ,S |
| Availability | ,Availability | ,8 ,S |
| System | ,System | ,9 ,S |

[Functional Group Device Types]

| #Group Name | ,Device Type |
|---|---|
| Web | ,WebServer |
| Firewall | ,Firewall |
| Database | ,DBServer |
| Application | ,AppServer |
| Network | ,Router |
| Network | ,Hub |
| Network | ,Switch |
| Network | ,Repeater |
| Network | ,Rmon Probe |
| Other | ,Printer |
| Other | ,Workstation |
| Other | ,NT Server |
| Other | ,Server |
| Other | ,Print Server |
| Other | ,MailServer |
| Other | ,Other |

[Functional Group Weightage]

| #Functional Group | ,Functional Group | ,Probability Factor |
|---|---|---|
| Web | ,Web | ,1.0 |
| Web | ,Firewall | ,1.0 |
| Web | ,Application | ,1.0 |
| Web | ,Database | ,1.0 |
| Web | ,Network | ,0.5 |
| Web | ,Other | ,0.5 |
| Firewall | ,Web | ,1.0 |
| Firewall | ,Firewall | ,1.0 |
| Firewall | ,Application | ,0.25 |
| Firewall | ,Database | ,0.25 |
| Firewall | ,Network | ,0.5 |
| Firewall | ,Other | ,0.25 |
| Application | ,Web | ,1.0 |
| Application | ,Firewall | ,1.0 |
| Application | ,Application | ,0.25 |
| Application | ,Database | ,0.25 |
| Application | ,Network | ,0.5 |
| Application | ,Other | ,0.25 |
| Database | ,Web | ,1.0 |
| Database | ,Firewall | ,1.0 |
| Database | ,Application | ,0.25 |
| Database | ,Database | ,0.25 |
| Database | ,Network | ,0.5 |
| Database | ,Other | ,0.25 |
| Network | ,Web | ,1.0 |
| Network | ,Firewall | ,1.0 |
| Network | ,Application | ,0.25 |
| Network | ,Database | ,0.25 |
| Network | ,Network | ,0.5 |
| Network | ,Other | ,0.25 |
| Other | ,Web | ,0.2 |
| Other | ,Firewall | ,0.2 |
| Other | ,Application | ,0.2 |
| Other | ,Database | ,0.2 |
| Other | ,Network | ,0.2 |
| Other | ,Other | ,1 |

Appendix A

[Attributes]

Attribute Type, Monitor Name, AttributeName, Rank, Above Normal, Below Normal
```
Availability,CheckPointRule,Availability ,5
    ,CheckPointRule,Connection Requests,3
    ,CheckPointRule,Packets Authcrypted ,2
    ,CheckPointRule,Packets Authorized ,3
    ,CheckPointRule,Packets Deauthorized,2
    ,CheckPointRule,Packets Decrypted ,2
    ,CheckPointRule,Packets Keyinstalled,2
Availability,CheckpointFwd ,AVAILABILITY    ,5
ResponseTime,DNSResponse ,Response Time    ,5
Availability,DNSResponse  ,AVAILABILITY    ,5
ResponseTime,FTPResponse ,Response Time    ,5
Availability,FTPResponse   ,AVAILABILITY    ,5
ResponseTime,httpmon      ,Total Response Time ,2
Availability,httpmon        ,AVAILABILITY    ,2
ResponseTime,httpmon        ,Internal Response Ti,4
ResponseTime,httpmon        ,External Response Ti,4
ResponseTime,httpmon        ,Total Connect Time ,3
ResponseTime,httpmon        ,Internal Connect Tim,3
ResponseTime,httpmon        ,External Connect Tim,3
         ,httpmon        ,Total Objects Not Fo,1
         ,httpmon        ,Internal Objects Not,1
```

Appendix B

Pinpoint configuration file / . . . / . . . /conf/pinpoint.conf
```
#           Pinpoint Configuration File             #
###########################################################

##########
# Filter parameters
# Syntax: filterRules.UserGroup=[true | false] (boolean)
##########
##########
# If set to true, events on the same device in certain functional
# groups will not be shown.
##########
filterRules.SameDevice=true
##########
# If set to true, baseline events are not shown.
##########
filterRules.BaselineEvents=false
##########
# If set to true, then events on different instances of same
# monitor type of the pinpointing event/alarm are not shown
##########
filterRules.OtherInstancesOfSameMonitor=true
##########
# If set to true, only the newest timestamped event is shown
# for a monitor instance and attribute pair.
##########
filterRules.OneEventForAnInstanceAttribute=true
##########
# If set to true, events on the same monitor instance
# and attribute are filtered out.
##########
filterRules.SameMonitorInstanceAttribute=true
##########
# If set to true, shows all the events on other instances of
# web url and transaction monitors, when pinpointing web
# trasaction event/alarm if they are in the same pinpoint group.
##########
filterRules.AllWebURLAndXInSamePPGrpForWebX=true
##########
# If set to true and the event's threshold is deleted by the
# user, then that evenet is removed.
##########
filterRules.InvalidThreshold=true
##########
# If set to true, shows all the events on other instances of
# web url monitors, when pinpointing web url
# event/alarm if they are in the same pinpoint group.
##########
filterRules.AllWebURLInSamePPGrpForWebURL=true
##########
# Scoring parameters
# Syntax: scoreRules.BaselineImportance=[true | false] (boolean)
##########
##########
# This property tells whether the baseline ranking given for each attribute
# should be factored into the total scoring or not.
##########
scoreRules.BaselineImportance=true
##########
# This property tells whether the event which falls into the same functional
# category should be ranked high or not
##########
scoreRules.SameFunctionalArea=true
scorePoints.SameFunctionalArea=1
##########
# This property tells whether the event severity should be considered in
# ranking the event or not. The event severities are fixed. The rank can be
# changed. The max rank should be the same as baseline event extreme-
  ness rule.
##########
scoreRules.AbsoluteEventSeverity=true
scorePoints.AbsoluteEventSeverity=[critical,4],[major,3],[minor,2],
[normal,1],[closed,0]
##########
# This property tells whether the baseline event's extremeness of the ab-
# normality be considered or not. The max rank for this rule should be the
# same as the absolute event severity.
# scorePoints.BaselineEventExtremeness=[range,rank],[range,rank], . . .
# range check: value > start range and value <= end range
##########
scoreRules.BaselineEventExtremeness=true
scorePoints.BaselineEventExtremeness=[80–100,4],[60–80,3],[40–60,2],
[10–40,1],[0–10,0]
##########
# This property tells whether the event on the same device as the alarm
# should be ranked high or not
##########
scoreRules.EventOnSameDevice=true
scorePoints.EventOnSameDevice=1
##########
# This property tells whether the event on the response time kind of attri-
# bute should be ranked high or not
##########
scoreRules.ResponseTimeEvent=true
scorePoints.ResponseTimeEvent=1
##########
# This property tells whether the event which belongs to the same group
# as the alarm should be ranked high or not
##########
scoreRules.EventInSameUserGroup=true
scorePoints.EventInSameUserGroup=1
##########
# This property tells whether the event belongs to the same monitor
# instance should be ranked high or not
##########
scoreRules.EventOnSameInstance=true
scorePoints.EventOnSameInstance=1
##########
# This property tells whether to consider the duration of the event within
# the duration of the alarm in calculating the score or not.
# scorePoints.EventDuration=[range(duration %),rank],[range,rank], . . .
# range check: value > start range and value <= end range
##########
scoreRules.EventDuration=true
scorePoints.EventDuration=[0–30,1],[30–50,2],[50–70,3],[70–90,4],
[90–100,5]
##########
# This property gives the maximum rank given for attribute importance in
# the pinpointfgattr.conf file. This value is used for calculating the score
# of each event.
```

-continued

Appendix B

```
#########
scorePoints.MaxAttrImportance = 5
#########
# This property gives the maximum rank given for attribute's baseline
# importance in the pinpointfgattr.conf file. This value is used for
# calculating the score of each event.
#########
scorePoints.MaxAttrBlImportance = 5
#########
# This property gives the default rank given for attribute's
* above baseline importance
#########
scorePoints.DefaultAttrAboveBlRank = 3
#########
# This property gives the default rank given for attribute's
* below baseline importance
#########
scorePoints.DefaultAttrBelowBlRank = 1
#########
# This property gives the default rank given for attribute's
* rank
#########
scorePoints.DefaultAttrRank = 3
```

What is claimed is:

1. A method of monitoring network performance comprising:
 maintaining a database of alarms and events from a system of monitored elements; and
 automatically identifying a possible cause of a specific alarm by correlating the specific alarm with a plurality of events using the database, wherein automatically identifying the possible cause comprises:
 (1) analysis of performance abnormalities and at least one of an event or alert;
 (2) statistical correlation;
 (3) elimination of unrelated causes;
 (4) user defined groupings; and,
 (5) relative weightings of monitored elements.

2. The method defined in claim 1 wherein one of the plurality of events comprises one of a selected group consisting of a performance abnormality, a threshold alert, and a software change.

3. The method defined in claim 1 further comprising performing statistical correlation on the performance abnormalities to generate a list of possible candidate abnormalities.

4. The method defined in claim 3 further comprising:
 performing isolation filtering to eliminate a set of abnormalities; and
 performing scoring and categorization on a filtered set of abnormalities to pinpoint the probable cause.

5. The method of claim 1 further comprising displaying the cause of the specific alarm.

6. The method of claim 1, wherein the monitored elements include network devices.

7. The method of claim 1, wherein the monitored elements include network systems.

8. The method of claim 1, wherein the monitored elements include network applications.

9. The method of claim 1, wherein the specific alarm consists of a notification of an occurrence of the plurality of events.

10. The method of claim 1, wherein the specific alarm is associated with a fault.

11. The method of claim 1, wherein the specific alarm is not associated with a fault.

12. The method of claim 1, wherein the automatically identifying the possible cause includes classifying the events based on functional groups.

13. The method of claim 12, wherein the functional groups are comprised of specific device types within the system of monitored elements.

14. The method of claim 12, wherein the classifying the events based on functional groups includes using a Graphical User Interface (GUI).

15. The method of claim 12, wherein the classifying the events based on functional groups includes a meta-data definition of the functional groups.

16. The method of claim 12, wherein the classifying the events based on functional groups includes creating default functional groups.

17. The method of claim 12, wherein the classifying the events based on functional groups includes creating additional functional groups.

18. The method of claim 12, wherein the classifying the events based on functional groups includes creating a probability value to represent an inter-relationship between a functional group and other functional groups.

19. The method of claim 18, wherein the probability value is between 0 and 1.

20. The method of claim 1, wherein the automatically identifying the possible cause includes classifying the events based on attribute groups.

21. The method of claim 20, wherein the attribute groups are comprised of specific performance statistics within the system of the monitored elements.

22. The method of claim 20, wherein the attribute groups include a Response Time type of attribute group.

23. The method of claim 20, wherein the attribute groups include an Availability type of attribute group.

24. The method of claim 20, wherein the attribute groups include a System type of attribute group.

25. The method of claim 20, wherein the classifying the events based on attribute groups includes a meta-data definition of the attribute groups.

26. The method of claim 20, wherein the classifying the events based on attribute groups includes creating attribute scores for the events.

27. The method of claim 26, wherein the attribute scores are between 0 to 5.

28. The method of claim 1, wherein the automatically identifying the possible cause includes filtering the events mandatorily.

29. The method of claim 1, wherein the automatically identifying the possible cause includes filtering the events optionally.

30. The method of claim 29, wherein the filtering the events optionally can be turn on/off selectively.

31. The method of claim 1, wherein the automatically identifying the possible cause includes sorting the events to separate filter-pass events from filter-fail events.

32. The method of claim 31, wherein the filter-pass events satisfy filtering rules.

33. The method of claim 31, wherein the filter-fail events do not satisfy the filtering rules.

34. The method of claim 1, wherein the automatically identifying the possible cause includes computing event scores for the plurality of events.

35. The method of claim 1, wherein the event scores are values between 0 to 100.

36. The method of claim 35, wherein the event scores indicate possibilities of the plurality of events being causes of the specific alarm.

37. A network performance monitor comprising:
a database maintenance module to maintain a database of alarms and events from a system of monitored elements;
an alarm cause identification module coupled to the database maintenance module, wherein the alarm cause identification module is configured to automatically identify a possible cause of a specific alarm by correlating the specific alarm with a plurality of events using the database, wherein the alarm cause identification module automatically identifies a possible cause based on (1) analysis of performance abnormalities and at least one of an event or alert, (2) statistical correlation, (3) elimination of unrelated causes, (4) user defined groupings and (5) relative weightings of monitored elements.

38. The monitor defined in claim 37 wherein one of the plurality of events comprises one of a selected group consisting of a performance abnormality, a threshold alert, and a software change.

39. The monitor defined in claim 37 wherein the alarm cause identification module performs statistical correlation on the performance abnormalities to generate a list of possible candidate abnormalities.

40. The monitor defined in claim 39 wherein the alarm cause identification module performs isolation filtering to eliminate a set of problems and performs scoring and categorization on a filtered set of abnormalities to pinpoint the probable cause.

41. The network performance monitor of claim 37 further including a display module to display the cause of the specific alarm.

42. The network performance monitor of claim 37 wherein the monitored elements include network devices, network systems, and network applications.

43. The network performance monitor of claim 37 wherein the specific alarm consists of a notification of an occurrence of the plurality of events.

44. A network performance monitor comprising:
means for maintaining a database of alarms and events from a system of monitored elements; and
means for automatically identifying a possible cause of a specific alarm by correlating the specific alarm with a plurality of events using the database, wherein the means for automatically identifying a possible cause comprises means for (1) analysis of performance abnormalities and at least one of an event or alert, (2) statistical correlation, (3) elimination of unrelated causes, (4) user defined groupings and (5) relative weightings of monitored elements.

45. The monitor defined in claim 44 wherein one of the plurality of events comprises one of a selected group consisting of a performance abnormality, a threshold alert, and a software change.

46. The monitor defined in claim 44 further comprising means for performing statistical correlation on the performance abnormalities to generate a list of possible candidate abnormalities.

47. The monitor defined in claim 46 further comprising means for performing isolation filtering to eliminate a set of abnormalities problems and means for performing scoring and categorization to pinpoint the probable cause.

48. The network performance monitor of claim 44 further including means for displaying the cause of the specific alarm.

49. The network performance monitor of claim 44 wherein the monitored elements include network devices, network systems, and network applications.

50. The network performance monitor of claim 44 wherein the specific alarm consists of a notification of an occurrence of the plurality of events.

51. A computer readable medium, the medium having stored thereon a sequence of instructions which, when executed by a processor, cause the processor to:
collect a database of alarms and events from a system of monitored elements; and
automatically identify a possible cause of a specific alarm by correlating the specific alarm with a plurality of events using the database, wherein automatically identifying a possible cause comprises (1) analysis of performance abnormalities and at least one of an event or alert, (2) statistical correlation, (3) elimination of unrelated causes, (4) user defined groupings and (5) relative weightings of monitored elements.

52. The computer software product defined in claim 51 wherein one of the plurality of events comprises one of a selected group consisting of a performance abnormality, a threshold alert, and a software change.

53. The computer software product defined in claim 51 further comprising performing statistical correlation on the performance abnormalities to generate a list of possible candidate abnormalities.

54. The computer software product defined in claim 53 further comprising performing isolation filtering to eliminate a set of problems; and
performing scoring categorization to pinpoint the probable cause.

55. The computer software product of claim 51 further including a sequence of instructions which, when executed by the processor, cause the processor to display the cause of the specific alarm.

56. The computer software product of claim 51 wherein the monitored elements include network devices, network systems and network applications.

57. The computer software product of claim 51 wherein the specific alarm consists of a notification of an occurrence of the plurality of events.

* * * * *